(12) United States Patent
Astvatsaturov

(10) Patent No.: US 11,711,259 B2
(45) Date of Patent: Jul. 25, 2023

(54) METHOD, SYSTEM AND APPARATUS FOR DETECTING DEVICE MALFUNCTIONS

(71) Applicant: ZEBRA TECHNOLOGIES CORPORATION, Lincolnshire, IL (US)

(72) Inventor: Yuri Astvatsaturov, Lake Forest, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 181 days.

(21) Appl. No.: 17/175,175

(22) Filed: Feb. 12, 2021

(65) Prior Publication Data

US 2022/0263704 A1  Aug. 18, 2022

(51) Int. Cl.
G06F 11/30 (2006.01)
H04L 12/24 (2006.01)
H04L 41/069 (2022.01)
H04L 41/0631 (2022.01)

(52) U.S. Cl.
CPC ........ *H04L 41/069* (2013.01); *G06F 11/3055* (2013.01); *H04L 41/065* (2013.01); *H04L 41/0631* (2013.01)

(58) Field of Classification Search
CPC ...................... H04L 41/00; H04L 41/06; H04L 41/0631–065; H04L 41/0677; H04L 41/0686; H04L 41/16; G06F 11/00; G06F 11/006; G06F 11/30; G06F 11/3055–3089
See application file for complete search history.

(56) References Cited

U.S. PATENT DOCUMENTS

| | | | |
|---|---|---|---|
| 9,625,266 B1* | 4/2017 | Chintakindi | G01C 21/3484 |
| 10,300,394 B1* | 5/2019 | Evans | A63F 13/86 |
| 10,820,292 B1* | 10/2020 | Peter | H04W 4/46 |
| 2004/0261431 A1 | 12/2004 | Singh et al. | |
| 2007/0244571 A1 | 10/2007 | Wilson et al. | |
| 2008/0147356 A1 | 6/2008 | Leard et al. | |
| 2011/0173496 A1 | 7/2011 | Hosek et al. | |
| 2012/0124456 A1* | 5/2012 | Perez | H04N 21/44218 715/200 |
| 2014/0365226 A1 | 12/2014 | Sato et al. | |
| 2015/0066430 A1* | 3/2015 | Priori | G05B 23/0235 702/179 |
| 2016/0009304 A1* | 1/2016 | Kumar | B61L 27/40 701/19 |
| 2016/0253077 A1* | 9/2016 | Kellner | G06F 3/04847 715/788 |
| 2017/0094231 A1* | 3/2017 | Elkenkamp | H04N 5/77 |

(Continued)

OTHER PUBLICATIONS

International Search Report and Written Opinion for International Application No. PCT/US2021/063030 dated Mar. 9, 2022.

*Primary Examiner* — Boris D Grijalva Lobos

(57) ABSTRACT

An example method of detecting device malfunctions at a subject device includes: obtaining a device event indicator representing an event detected at a device sensor of the subject device; obtaining an external event indicator representing an external event detected by an environmental sensor, the external event occurring external to the subject device; and identifying a device malfunction at the subject device based on the device event indicator and the external event indicator.

34 Claims, 8 Drawing Sheets

(56) References Cited

U.S. PATENT DOCUMENTS

| | | | |
|---|---|---|---|
| 2020/0118358 A1* | 4/2020 | Lee | G06N 20/00 |
| 2020/0193239 A1* | 6/2020 | Wilson | G06F 16/38 |
| 2022/0005121 A1* | 1/2022 | Hayward | G06Q 40/08 |
| 2022/0050547 A1* | 2/2022 | Silverstein | G06F 3/048 |
| 2022/0066906 A1* | 3/2022 | Kumar | G06F 11/328 |

* cited by examiner

METHOD, SYSTEM AND APPARATUS FOR DETECTING DEVICE MALFUNCTIONS

BACKGROUND

Devices such as printers, scanners and the like may experience minor malfunctions from time to time. These malfunctions may be readily rectified by everyday users rather than technicians, causing them to be under-reported and potentially leaving chronic problems undetected.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
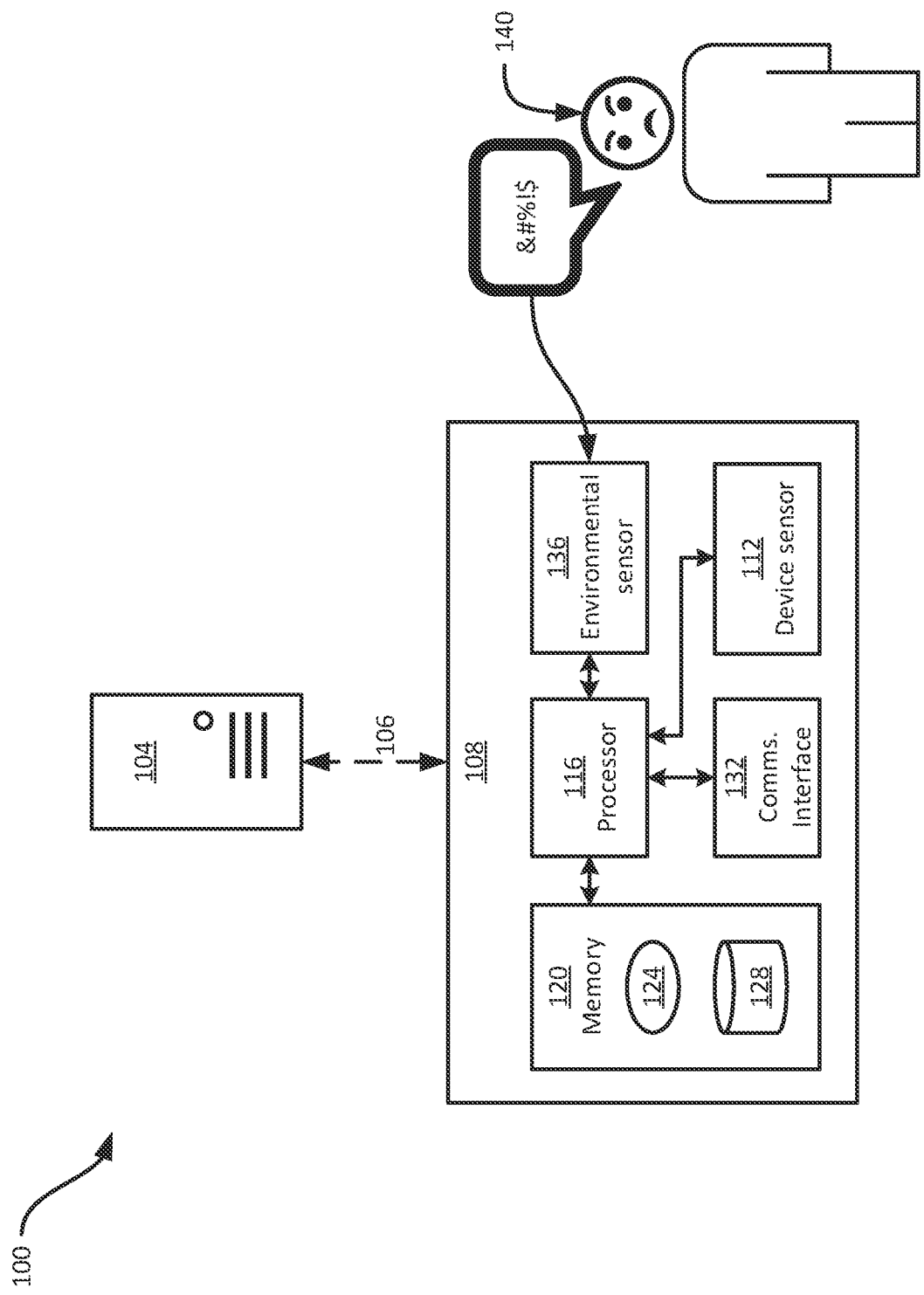
FIG. 1 is a diagram illustrating system for detecting device malfunctions.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: obtaining a device event indicator representing an event detected at a device sensor of a subject device; obtaining an external event indicator representing an external event detected by an environmental sensor, the external event occurring external to the subject device; and identifying a device malfunction at the subject device based on the device event indicator and the external event indicator.

Additional examples disclosed herein are directed to a server including: a memory; a processor interconnected with the memory, the processor configured to: obtain a device event indicator, the device event indicator representing an event detected at a device sensor of a subject device; obtain an external event indicator representing an external event detected by an environmental sensor, the external event occurring external to the subject device; and identify a device malfunction at the subject device based on the device event indicator and the external event indicator.

Further examples disclosed herein are directed to a device including: a device sensor to detect device events occurring at the device; a memory; a communications interface; and a processor interconnected with the device sensor, the memory and the communications interface, the processor configured to: obtain, from the device sensor, a device event indicator representing a device event; obtain an external event indicator representing an external event occurring external to the device; and identify a device malfunction of the device based on the device event indicator and the external event indicator.

Further examples disclosed herein are directed to a system comprising: a subject device including a device sensor configured to detect device events; an environmental sensor configured to detect external events occurring external to the subject device; a server in communication with the subject device and the environmental sensor, the server comprising a memory and a processor configured to: obtain a device event indicator from the subject device, the device event indicator indicative of a potential device malfunction; obtain an external event indicator from the environmental sensor, the external event indicator indicative of the potential device malfunction; and identify a device malfunction at the subject device based on the device event indicator and the external event indicator.

FIG. 1 depicts an example system 100 for identifying device malfunctions. The system 100 includes a server 104 in communication with a subject device 108 via a communication link 106. Generally, the system 100 detects device events representing actions or states of the subject device 108 (also referred to herein as simply the device 108) as well as external events occurring external to the device 108. Using correlations between the device events and the external events, the system 100 may determine that the device 108 experienced a malfunction and may track device malfunctions to identify trends and allow troubleshooting or training to reduce the device malfunction frequency. The system 100 may be valuable to identify device malfunctions which may often be rectified by device users at the time of the incident and hence not reported to technicians, and particularly, trends of increasing frequency of such device malfunctions.

The device 108 may be a device, such as, for example, a mobile or stationary printer, a barcode scanner, a handheld computer, a mobile device, a photocopier, a point-of-sale register, or other devices which may periodically malfunction and/or require maintenance. The device 108 includes a device sensor 112 configured to detect device events occurring at the subject device 108. For example, when the device 108 is a printer, the device events may include cover or tray openings and closings, removal or resetting of internal components such as print heads, ink supplies, ribbon roll, print media, and the like. Accordingly, the device sensor 112 may include a suite of sensors configured to detect the various device events.

The device 108 further includes a processor 116 interconnected with a non-transitory computer-readable storage medium, such as a memory 120. The memory 120 may include a combination of volatile memory (e.g. Random Access Memory or RAM) and non-volatile memory (e.g. read only memory or ROM, Electrically Erasable Programmable Read Only Memory or EEPROM, flash memory).

The processor 116 and the memory 120 may each comprise one or more integrated circuits.

The memory 120 stores computer-readable instructions for execution by the processor 116. In particular, the memory 120 stores a control application 124 which, when executed by the processor 116, configures the processor 116 to process the detected device events to determine whether to send the detected device events to the server 104 for further processing. The memory 120 may additionally store a repository 128 containing a buffer of detected device event data and detected external event data. For example, the buffer may be a rolling buffer spanning a predefined buffer period. That is, the device 108 may store detected device event data and/or detected external event data for a predefined period of time (e.g., 5 minutes, 10 minutes, 30 minutes or other suitable periods of time), after which, the data is discarded. The predefined buffer period may be selected based on an average time between a device event and an external event which are related to one another. In particular, the predefined buffer period may be defined to be longer than the average time between related device events and external events to allow identification of potential device events and external events indicative of a device malfunction. Other rules or data for detecting device malfunctions may also be stored in the repository 128.

The device 108 further includes a communications interface 132 interconnected with the processor 200. The communications interface 132 includes suitable hardware (e.g., transmitters, receivers, network interface controllers and the like) allowing the device 108 to communicate the other computing devices—particularly the server 104 via the communication link 106. For example, the link 106 may be a wireless link provided by a wireless local area network (WLAN) deployed by one or more access points (not shown). In other examples, the server 104 may be located remotely from the device 108 and the link 106 may therefore include one or more wide-area networks such as the Internet, mobile networks, and the like. The specific components of the communications interface 132 are therefore selected based on the type of network or other links that the device 108 is to communicate over.

The device 108 may further include an environmental sensor 136 configured to detect external events (i.e., events occurring external to the device 108 and/or events initiated by external forces which are not associated with specific device events). For example, the environmental sensor 136 may include a microphone configured to detect certain audio signatures, phrases or patterns which may be articulated by a nearby user 140, for example, when the user 140 is frustrated that the device 108 is malfunctioning. In some examples, the environmental sensor 136 may be a suite of sensors configured to detect external events. For example, in addition to a microphone, the environmental sensor 136 may include an accelerometer, gyroscope, or the like to detect if the device 108 is dropped, hit, or experiences another physical movement. In the present example, the environmental sensor 136 is depicted as integrated with the device 108. Accordingly, the environmental sensor 136 may be interconnected with the processor 116 to allow the processor 116 to process detected external events and store a buffer of detected external event data in the repository 212.

In some examples, the system 100 may include one or more environmental sensors 136 distinct from the device 108. For example, the environmental sensors 136 may include cameras or other sensors to detect image data, microphones to detect audio data, short-range wireless detectors to detect data signals, or the like. In examples where the environmental sensors 136 are distinct from the device 108, the environmental sensors 136 may additionally include a processor and memory capable of processing the detected external events and storing a buffer of detected external event data. The environmental sensors 136 may additionally include communications interface to communicate the external event data and/or the external event indicators to the device 108 and/or the server 104.

Figure 2:
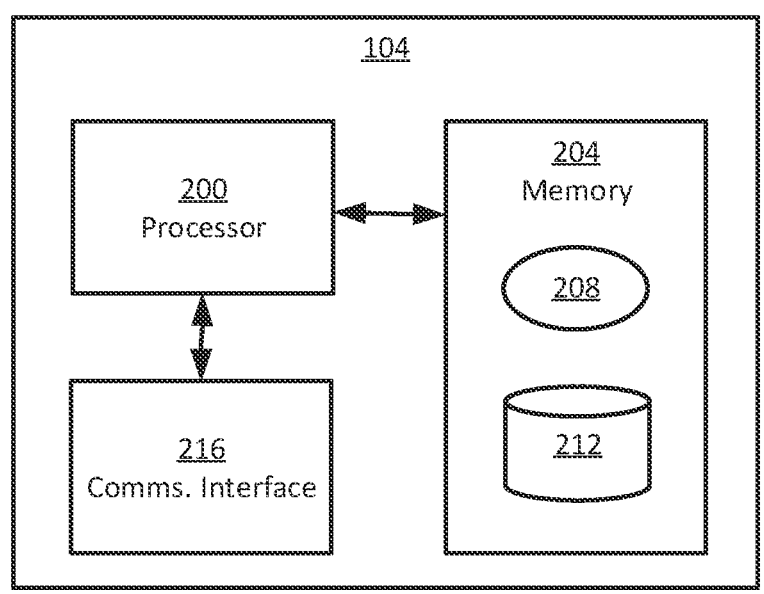
FIG. 2 is a block diagram of certain internal hardware components of the server of FIG. 1.

Referring to FIG. 2, the server 104, including certain internal components, is shown in greater detail. The server 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores an application 208 which, when executed by the processor 200, configures the processor 200 to perform various functions discussed below in greater detail and related to the detection of device malfunctions occurring at the device 108. The application 208 may also be implemented as a suite of distinct applications. The memory 204 also includes a repository 212 storing rules and data for detecting device malfunctions. For example, the repository 212 may store previously recorded device malfunction details to allow the server 104 to determine trends in the device malfunctions.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the dimensioning operations discussed herein.

The server 104 also includes a communications interface 216 interconnected with the processor 200. The communications interface 216 includes suitable hardware (e.g. transmitters, receivers, network interface controllers and the like) allowing the server 104 to communicate with other computing devices—such as the device 108—via the link 106. The specific components of the communications interface 216 are selected based on the type of network or other links that the server 104 is to communicate over.

The processor 200 may also be connected to one or more input and/or output devices (not shown). The input devices can include one or more keyboards, mice, touch-sensitive display screens or the like. The output devices can further include one or more display screens, sound generators, or the like for providing output or feedback to an operator.

Figure 3:
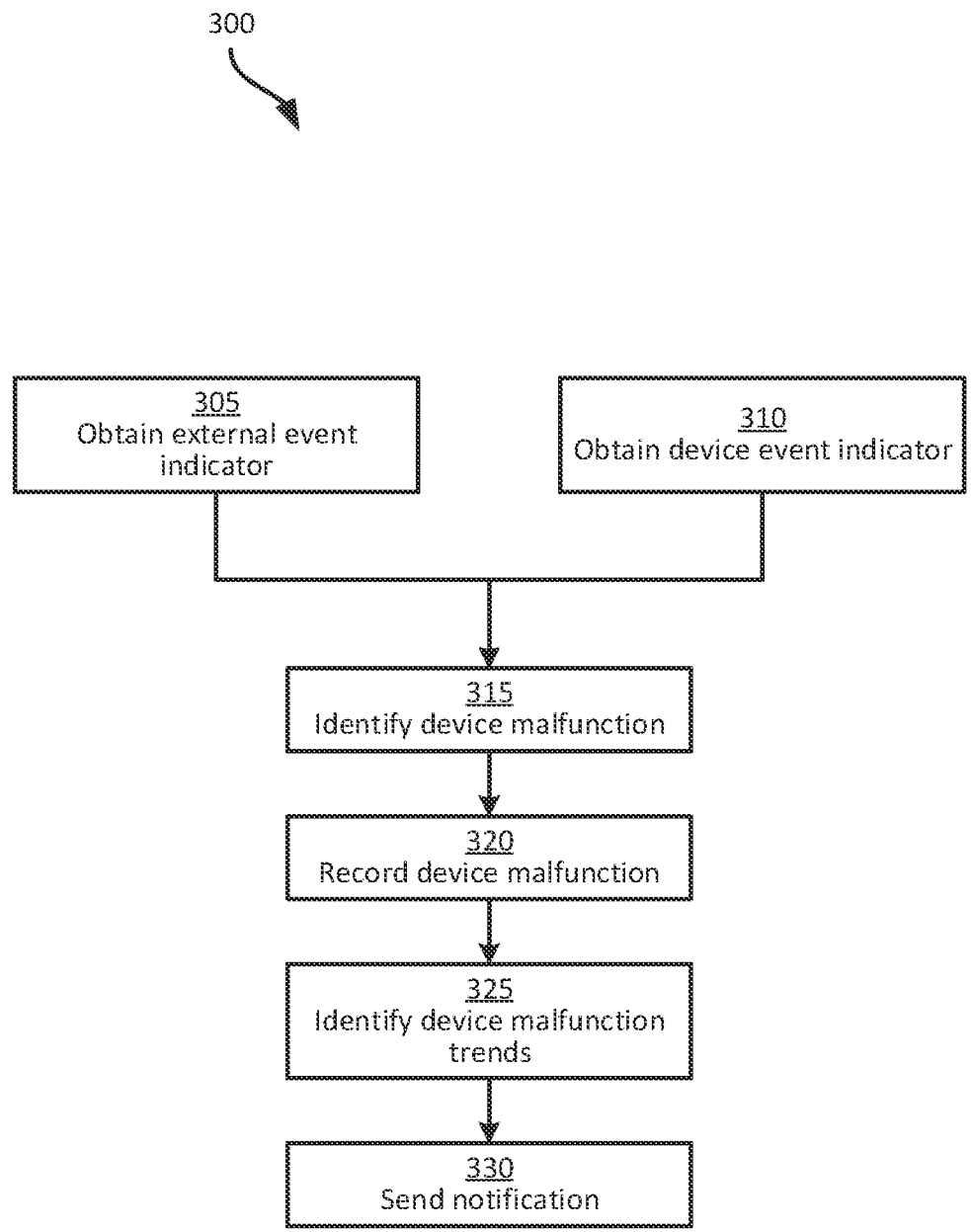
FIG. 3 is a flowchart of a method of detecting device malfunctions.

The functionality of the server 104, as implemented via execution of the applications 208 by the processor 200 will now be described in greater detail, with reference to FIG. 3. FIG. 3 illustrates a method 300 of detecting device malfunctions, which will be described in conjunction with its performance in the system 100, and in particular, by the server 104 and the device 108, with reference to the components illustrated in FIGS. 1 and 2. In some examples, some or all of the method 300 may be performed by the device 108 itself.

At block 305, the device 108 obtains a device event indicator representing a device event detected at the device sensor 112 of the device 108. The device event may be for example opening and/or closing a tray and/or a cover, removing or resetting of internal components such as print heads, ink supplies, ribbon roll, print media, or the like. In some examples, the device event indicator may represent a sequence of events (e.g., a cover opening, a realignment of the print head, and a cover closing).

At block 310, the device 108 obtains an external event indicator representing an external event detected by the environmental sensor 136. The external event is an event occurring external to the subject device 108 and/or an event initiated by an external force which results in an undefined result at the environmental sensor 136 (i.e., a result not associated with a specific device event). In general, the external event corresponds to a user frustration indicator. That is, the external event represents an event which indicates that a nearby user is frustrated. For example, the environmental sensor 136 may be a microphone configured to detect audio signals from the nearby user 140 of the device 108. In this case, the user frustration indicators may be specific audio patterns which are commonly associated with device malfunctions (e.g., particular patterns pertaining to the type of device malfunction, such as "jam," "jammed," or "paper jam" when the device malfunction is a paper jam) or audio patterns generally associated with the frustration of the user 140 while using the device 108 (e.g., representative of the user 140 tapping or hitting the device 108, cursing or swearing such as "this stupid printer," "I hate this scanner," or "why can't this computer ever work right", or the like).

At block 315, the device 108 correlates the device event indicator and the external event indicator to identify a device malfunction. For example, the device 108 may identify a device malfunction when the device event indicator and the external event indicator occur within a threshold period of time of one another. That is, the correlation of the device event indicator and the external event indicator representing a user's frustration with the device 108, may allow the device 108 to determine that the device event indicator corresponds to a device malfunction. It should be appreciated that while references are made to a "device malfunction," in some instances a malfunction may not necessarily be occurring in a normal sense of hardware not functioning properly due to a non-working or a poorly working component. Instead, in those instances a "device malfunction" may be interpreted as the device not functioning as desired by the user; a potential consequence of user inexperience and/or a lack of understanding of how to properly use a device. As an example, a barcode reader not operating in a picklist mode may be a result of not setting the appropriate settings within the settings-menu rather than a component malfunction. However, for purposes of this application, such instances should also be considered to fall within the scope of a "device malfunction."

In some examples, any one of the blocks 305 to 315 may occur at the server 104; however, in a preferred embodiment, detection of the device event indicator and the external event indicator and the subsequent identification of the device malfunction is performed at the device 108 to reduce the bandwidth load of data transmitted to the server 104. Accordingly, at block 315, after having identified a device malfunction, the device 108 may transmit details of the device malfunction to the server 104. This may include the data pertaining to the device event and the external event which served as indicators for the device malfunction. In some examples, for privacy purposes, only the device events may be transmitted to the server 104.

The performance of blocks 305 and 310 may occur simultaneously or in response to one another. In one example, the system 100 may first identify external event indicators, and in response to identifying an external event indicator, find device events occurring within a threshold period of time in order to identify the device malfunctions.

Figure 4:
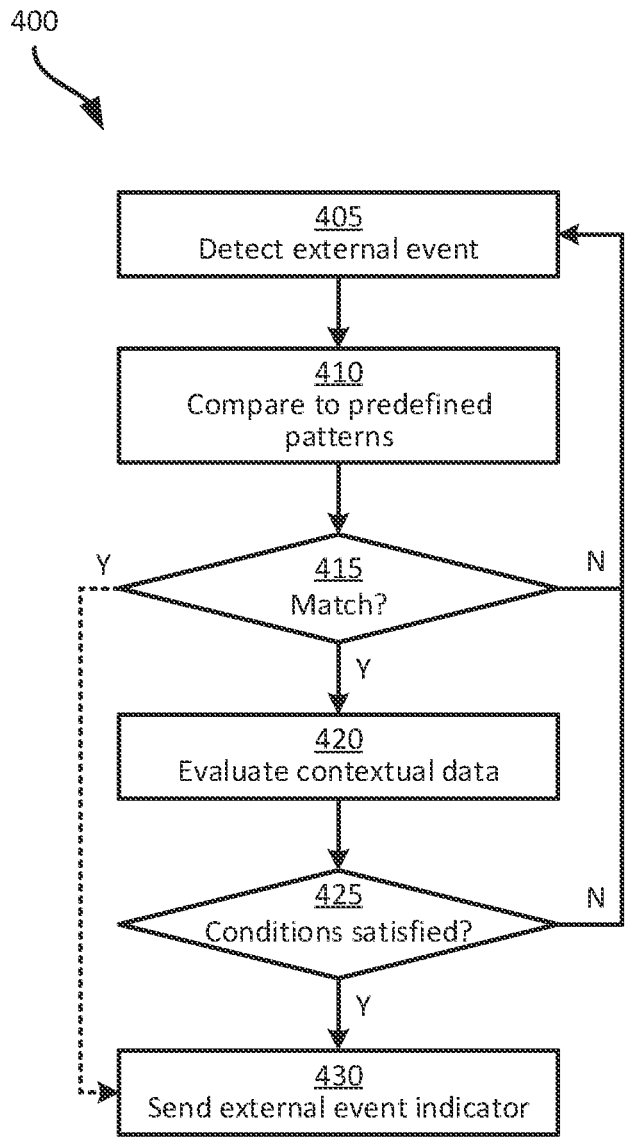
FIG. 4 is a flowchart of a method of identifying an external event indicator for use during the method of FIG. 3.

For example, referring to FIG. 4, a flowchart of an example method 400 of identifying an external event indicator is depicted. The method 400 will be described in conjunction with its performance by the processor 116 via execution of the application 124. In other examples, the method 400 may be performed by a distinct processor associated with the environmental sensor 136 or other suitable devices.

At block 405, the environmental sensor 136 detects an external event. The external event may be an audio signal, an image sequence, detection of a drop or hit resulting from the device 108 being thrown, or the like, based on the type of environmental sensor 136 employed in the system 100.

At block 410, the processor 116 compares the external event data patterns from the detected external event data to predefined external event patterns representing external event indicators which correspond to user frustration indicators. For example, when the external event is an audio signal, the predefined external event patterns may be specific audio patterns which are commonly associated with device malfunctions (e.g., particular words or phrases articulated by users pertaining to the type of device malfunction, such as "jam," "jammed," or "paper jam" when the device malfunction is a paper jam) or audio patterns generally associated with the frustration of the user 140 while using the device 108 (e.g., representative of the user 140 tapping or hitting the device 108, cursing or swearing, or the like).

At block 415, if no matches are detected, the processor 116 may determine that the detected external event is unrelated to a user being frustrated and returns to block 405. If, at block 415, the processor 116 detects a match between at least a portion of the detected external event data and one of the predefined patterns, the processor 116 identifies the external event data as an external event indicator and may proceed to block 420. In some examples, rather than proceeding to block 420 to evaluate contextual data, the processor 116 may proceed directly to block 430.

At block 420, the processor 116 obtains and evaluates contextual data related to the external event data which matches the predefined external event patterns. Specifically, the processor 116 may compare the contextual data to predefined conditions representing potential frustration of a user. For example, for audio data, the contextual data may include the volume and tone of the audio signal, as well as the context of the predefined pattern within the audio signal. Such contextual data may be obtained, for example by inputting the audio signal into an artificial intelligence engine (e.g., employing machine learning, natural language processing, neural networks, or the like) to identify the nuances of the audio signal. The volume data may assist in differentiating between audio signals directed at frustration with the subject device 108 (e.g., having higher volume and corresponding with a user directly interacting with the subject device 108) and other nearby devices, people, or objects within range of the environmental sensor (e.g., having lower volume and corresponding with a user further away from the subject device 108). The context of the predefined pattern may assist in differentiating between audio signals relating to a potential device malfunction (e.g., "there's a paper jam again") and conversational signals including the predefined pattern (e.g., "I have a peanut butter and jam sandwich for lunch today"). The tone of the audio signal may assist in differentiating between a frustrated or negative use of the predefined pattern (e.g., "what the hell is wrong with this printer?!") and an excited or positive use of the predefined pattern (e.g., "hell yeah, this looks great!"). Other contextual data may similarly assist in the determination of whether the detected external event constitutes an indicator that a user is frustrated.

At block 425, if the conditions of the contextual data are not satisfied (i.e., the contextual data indicates that the use of the predefined pattern in the external event is not representative of user frustration), the processor 116 returns to block 405. If one or more of the conditions of the contextual data are satisfied, the processor 116 confirms the external event data as an external event indicator and proceeds to block 430.

At block 430, the processor 116 can send an external event indicator to the server 104 and/or the detection of the external event indicator can be used (e.g., at the device 108) in conjunction with the obtaining of the device event indicator as described in connection with step 310 above and below. The external event indicator may include data representing the external event determined to be an indicator of user frustration, including, but not limited to, audio recordings, image data, accelerometer data, and/or position data.

Figure 5:
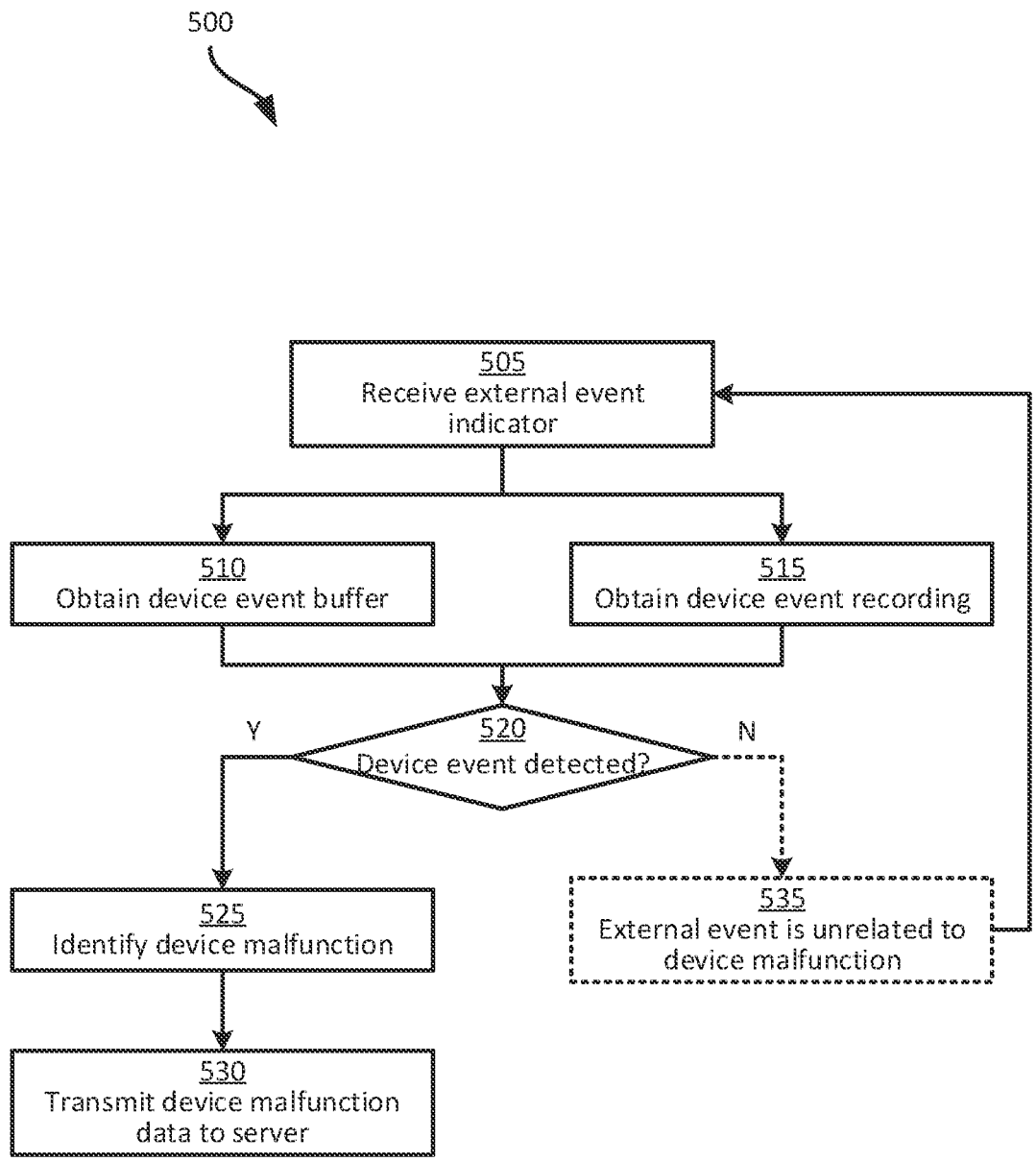
FIG. 5 is a flowchart of an example implementation of blocks 305-315 of the method of FIG. 3.

FIG. 5 depicts a flowchart of an example method 500 of performing of blocks 305-315 of the method 300, for example in response to detection of an external event via the method 400. Specifically, the method 500 is described in conjunction with its performance by the device 108. In other examples, some or all of the method 500 may be performed by the server 104.

At block 505, the device 108 receives an external event indicator as sensed by the environmental sensor 136 (which may be internal or external to the device 108) and described by the method 400. In response to receiving the external event indicator, the device 108 identifies device events occurring withing a predefined period of time of the external event indicator. That is, since the external event indicator represents user frustration, the device 108 is configured to identify device events which may correspond to a device malfunction causing the user's frustration. In particular, the device 108 may perform either or both of blocks 510 and 515.

At block 510, the device 108 obtains data from the device event data buffer. That is, the device 108 may retrieve the device event data recorded over the predefined buffer period (e.g., 30 seconds, 5 minutes, 10 minutes, 30 minutes, or other suitable periods) from the memory 120. The device event data buffer therefore includes device events occurring at the device 108 within the predefined buffer period prior to the external event occurring. In some examples, the predefined buffer period may correspond to the predefined period of time in which to identify device events potentially related to the external event indicator.

At block 515, the device 108 obtains data from a device event recording. That is, the device 108 may initiate a further recording of device event data over a subsequent recording period (e.g., 30 seconds, 5 minutes, 10 minutes, 30 minutes, or other suitable periods). That is, the device 108 may record device events occurring over the subsequent recording period and store said device events in the device event recording. The device event recording will therefore include device events occurring at the device 108 within the subsequent recording period after the external event occurring. The recording period may similarly correspond to the predefined period of time in which to identify device events potentially related to the external indicator.

At block 520, the device 108 determines whether any device events exist in the device event data buffer and the device event recording. Specifically, if the device event data buffer and/or the device event recording do not already correspond to the predefined period of time, the device 108 may determine whether any device events occurred in the predefined period of time before or after the external event. If the determination at block 520 is affirmative, the device 108 proceeds to block 525.

At block 525, after having identified a device event indicator, the device 108 uses the device event indicator and the external event indicator to identify a device malfunction. The device 108 may simply identify that a device malfunction exists, or the device 108 may identify a specific type of device malfunction. For example, the device 108 may store, in the repository 212, an association between device event indicators, external event indicators and device malfunctions. In other examples, the device 108 may input the device event indicator and the external event indicator into an artificial intelligence engine to determine the device malfunction.

At block 530, the device 108 transmits device malfunction data to the server 104. In particular, the device 108 may transmit the device event data and, optionally, the external event data to the server 104 for further analysis.

If the determination at block 520 is negative, the device 108 may proceed to block 535 to determine that the external event is unrelated to a device malfunction. In other words, while a frustration indicator was detected, it was not related to the operation of the device. The device 108 then returns to block 505 to receive further external event indicators.

Figure 6:
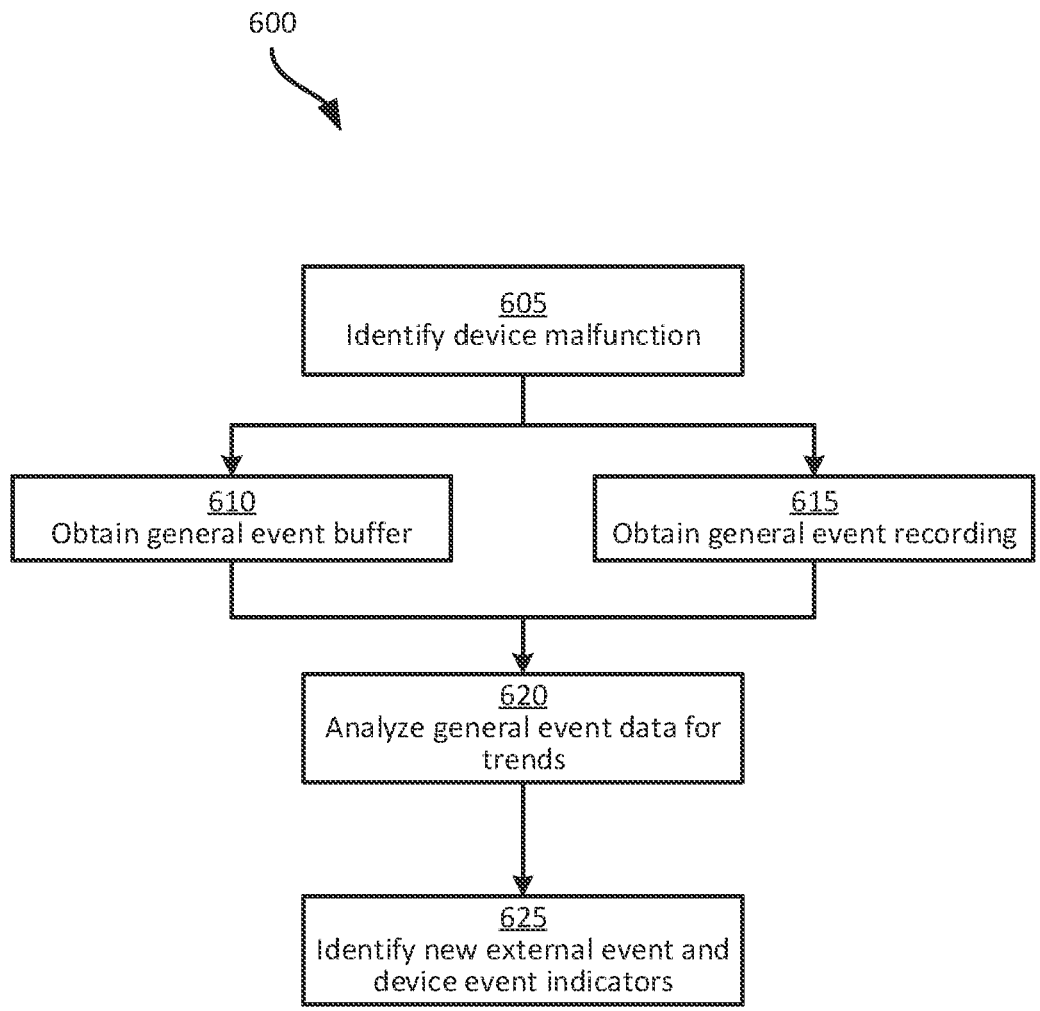
FIG. 6 is a flowchart of a method of identifying new external event indicators.

In some examples, after identifying a device, the device 108 may additionally endeavor to identify further external event indicators which may be indicative of the device malfunction. For example, FIG. 6 depicts a flowchart of an example method 600 of identifying further external event indicators.

The method 600 is initiated at block 605 and any part thereof may be performed by either or both of the device 108 and/or server 104, in which a device malfunction is identified. For example, a device malfunction may be identified via execution of the method 500. In particular, the method 600 may include either or both of blocks 610 and 615.

At block 610, the device 108 obtains a general event data which may include data from either device events, external events, or any combination thereof. That is, the device 108 may request, from the environmental sensor 136 and/or from internal logs, external event or internal device data recorded over the previous predefined buffer period (e.g., 30 seconds, 5 minutes, 10 minutes, 30 minutes, or other suitable periods). The general event data buffer therefore includes external events occurring near the device 108 and recorded by the environmental sensor 136 and/or device events recorded on a device event log within the predefined buffer period prior to the device malfunction being identified.

At block 615, the device 108 obtains an general event recording. That is, the device 108 may request that the environmental sensor 136 initiate a further recording of external event data or that device 108 capture device events in a log over a subsequent recording period. The device 108 and/or the environmental sensor 136 may therefore record events occurring over the subsequent recording period and optionally send said recording to the server 104. The event recording will therefore include events occurring near or at the device 108 within the subsequent recording period after the identification of the device malfunction.

At block 620, the device 108 analyzes the general event data for trends or additional indications of malfunction(s). For example, the device 108 may identify patterns in the general event data which do not correspond to existing predefined patterns of external event indicators. The device 108 may further compare these patterns to historical data of general events occurring near the time of an identified device malfunction to identify patterns which may represent further external event indicators or device event indicators. For example, the device 108 may input the external event data from the external event data buffer and the external event data recording into an artificial intelligence engine to identify patterns in the external event data.

At block 625, based on the analysis at block 620, the device 108 may identify new event indicators. For example, the device 108 may identify new external event data patterns which, when identified in external event data, indicate that the corresponding external event is indicative of user frustration, and hence which, when coupled with a device event, may indicate a potential device malfunction. The server 104 may store the new external event data patterns as predefined patterns in the repository 212.

For example, in the instance where the device malfunction is a paper jam of a printer, the paper jam may often be accompanied by a crunching noise as the paper gets jammed in the print head or cartridge. The device malfunction may be identified using an external event indicator of a user identifying that the "printer is jammed" accompanied by a device event sequence of the cover being opened, the print cartridge being realigned, and the cover being closed. A subsequent performance of the method 600 may identify that the crunching noise may additionally serve as an external event indicator of the paper jam malfunction. This may assist in identifying instances where the user simply fixes the paper jam without any commentary.

Upon performing method 600 and identifying any new device event indicators and/or external event indicators, those new indicators may be used in future methods associated with detecting potential device malfunctions.

Additionally, responsive to identifying a device malfunction at step 525, additional checks on the device hardware may be initiated by remote requests (e.g., coming from the server 104) that are sent either automatically in response to a detection of a predetermined device malfunction or via a remote user. Such a transmission of follow-up checks can help reveal specific problems with the hardware (or a lack thereof) which can further help identify problem areas with the device and/or user. The results of the checks can be transmitted back to the server 104 for further analysis and/or alerts can be sent to the device users and/or managers indicating actual device malfunctions if they are identified in response to the checks.

Figure 7:
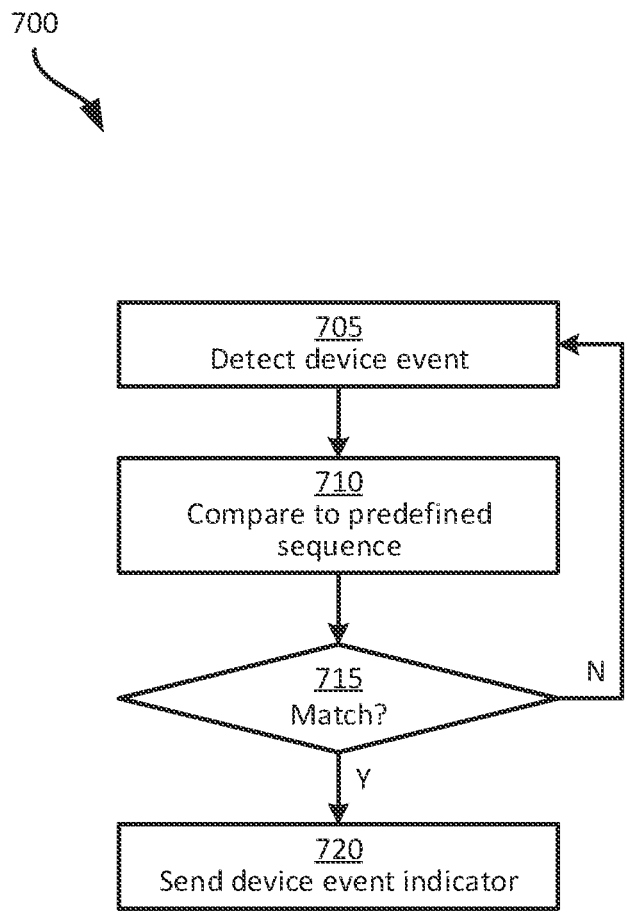
FIG. 7 is a flowchart of a method of identifying device event indicators for use during the method of FIG. 3.

In another example, the system 100 may first identify a device event indicator, and in response to identifying a device event indicator, find external event indicators occurring within a threshold time period in order to identify the device malfunction. For example, referring to FIG. 7, a flowchart of an example method 700 of identifying a device event indicator is depicted. The method 700 will be described in conjunction with its performance by the processor 116 via execution of the application 124.

At block 705, the device sensor 112 detects a device event. In some examples, the device sensor 112 may detect a series of device events. The device events may be events such as opening and/or closing a tray and/or a cover, removing or resetting of internal components such as print heads, ink supplies, ribbon roll, print media, or the like.

At block 710, the processor 116 compares the detected device event to a predefined event or sequence of events representing device event indicators which may correspond to device malfunctions. For example, the sequence may include opening the cover, realigning the print cartridge and closing the cover. Specifically, the memory 120 may store a list of predefined events and sequences of events to compare detected events to. The list represents events which warrant an additional review of external events to determine whether an instance of the event corresponds to a device malfunction.

At block 715, if no matches are detected, the processor 116 may determine that the detected device event does not require a review of additional external events and returns to block 705. If, at block 715, the processor 116 detects a match between the detected device events and a predefined device event sequence, the processor 116 proceeds to block 720.

At block 720, the processor 116 may send a device event indicator to the server 104. The device event indicator may include data representing the device event(s) determined to be an indicator of a potential device malfunction.

Figure 8:
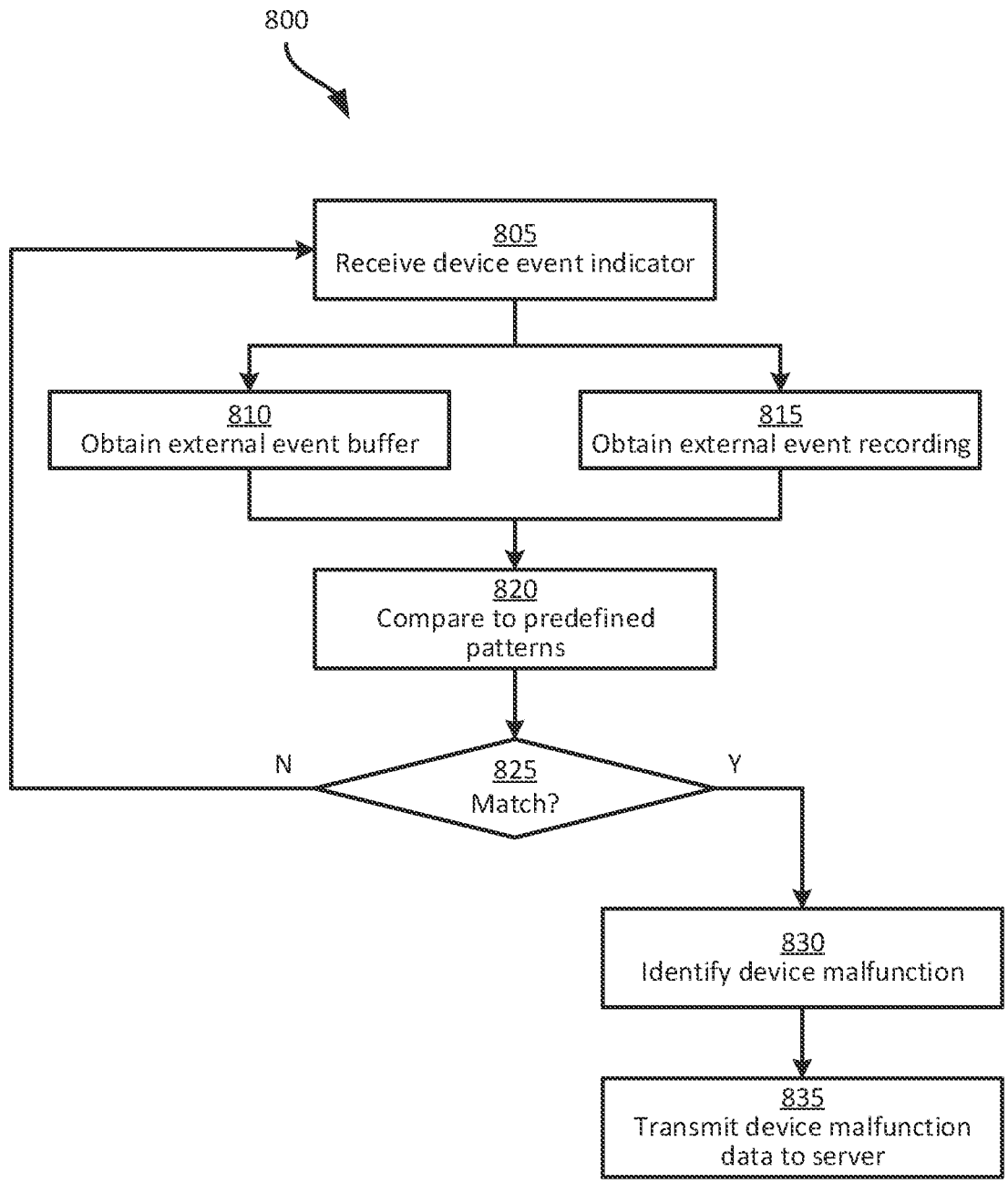
FIG. 8 is a flowchart of another example implementation of blocks 305-315 of the method of FIG. 3.

FIG. 8 depicts a flowchart of an example method 800 of performing blocks 305-315 of the method 300, for example in response to detection of a device event indicator via the method 700. Specifically, the method 800 is described in conjunction with its performance by the device 108. In other examples, some or all of the method 800 may be performed by the server 104.

At block 805, the device 108 identifies a device event indicator. For example, the device event indicator may be identified after performance of the method 700. In response to identifying the device event indicator, the device 108 is configured to identify whether any external events occurring within a predefined period of time of the device event indicator indicate a device malfunction. In particular, the device 108 may obtain external event data by performing either or both of blocks 810 and 815.

At block 810, the device 108 obtains the external event data buffer. That is, the device 108 may retrieve the external event data recorded over the previous predefined buffer period from the memory 120. The external event data buffer therefore includes external events occurring near the device 108 and recorded by the environmental sensor 136 within the predefined buffer period prior to the device event indicator. The predefined buffer period may correspond to the predefined period of time in which to identify external events potentially related to the device event indicator.

At block 815, the device 108 obtains an external event recording. That is, the device 108 or the environmental sensor 136 may initiate a further recording of external event data over a subsequent recording period. The device 108 and/or the environmental sensor 136 may therefore record external events occurring over the subsequent recording period. The external event recording will therefore include external events occurring near the device 108 within the subsequent recording period after the identification of the device event. The recording period may similarly correspond to the predefined period of time in which to identify external events potentially related to the device event indicator.

At block 820, the device 108 compares the detected external event data to predefined patterns representing external event indicators which may correspond to user frustration indicators. For example, when the external event is an audio signal, the predefined may be specific audio patterns which are commonly associated with device malfunctions (e.g., particular words or phrases articulated by users when a device malfunction is experienced, including expressions of frustration, such as derogatory language or the like). In some examples, in addition to matching the external event data to the predefined patterns, the device 108 may additionally obtain contextual data, such as volume, tone, and context of an audio signal in order to identify the external event as an external event indicator corresponding to a device malfunction.

At block 825, if no matches are detected, or the contextual data of the external event data indicates a lack of correspondence to user frustration, the device 108 may determine that the detected device event indicator is unrelated to a potential device malfunction and may return to block 805.

If, at block 825, the device 108 detects a match between at least a portion of the detected external event data and one of the predefined patterns, the device 108 identifies an external event indicator corresponding to a user frustration indicator and proceeds to block 830. At block 830, the server 104 correlates the external event indicators from the external event buffer and the external event recording to identify a device malfunction at the device 108. The device 108 may identify the existence of a device malfunction based on the existence of the device event indicator and the external event indicator occurring within the threshold period of time. In other examples, the device 108 may identify a specific type of device malfunction. For example, the server 104 may compare the device event indicators and external event indicators to historical data of device malfunctions to identify patterns and trends in the combination of the device event indicators and external event indicators. For example, the server 104 may input the device event data into an artificial intelligence engine (e.g., employing machine learning, neural networks, or the like) to identify correlations between the external event indicators and the device event indicators to determine the device malfunction.

At block 835, the device 108 transmits device malfunction data to the server 104. In particular, the device 108 may transmit the device event data and, optionally, the external event data to the server 104 for further analysis. As with the previous implementation, in response to detecting a device malfunction, additional checks may be initiated on the device hardware and appropriate alerts may be provided to various users in response to positive results indicating actual malfunctions being received.

Returning to FIG. 3, at block 320, having identified a device malfunction, the server 104 records details of the device malfunction, for example in the repository 212 of the memory 204. The server 104 may record the type of device malfunction identified, contextual data (e.g., date and time data, an identifier of the device 108, and the like), as well as some or all of the device event data and the external event data triggering the identification of the device malfunction. For example, the server 104 may record the device event or sequence of device events, as well as audio patterns detected by a microphone, employee identifiers, and the like.

At block 325, the server 104 identifies device malfunction trends. For example, the server 104 may compare the device malfunction identified at block 315 with historical data pertaining to the same type of device malfunction to determine whether the frequency exceeds a threshold frequency. For example, if the same type of device malfunction occurs, on average, more than once per day, the server 104 may identify that type of device malfunction as a chronic problem to be address by a device technician. In other examples, the server 104 may identify that a particular user tends to be using the device 108 when a particular type of device malfunction occurs, and hence the user may need additional training to properly operate the device 108. In examples where external event data is not transmitted to the server 104 for privacy protection, the analysis of device events corresponding to device malfunctions (e.g., a constant cover opening associated with a malfunction) may still provide some insight as to the condition of the device 108. In some examples, the historical device malfunction data stored in the repository 212 may be input into an artificial intelligence engine to identify the device malfunction trends.

At block 330, having identified a device malfunction trend, the server 104 sends a notification of the trend to a client device to notify pertinent personnel. For example, after having identified a chronic problem, the server 104 may send a notification to a client device operated by an IT team and/or technician. After having identified a training issue with a particular user, the server 104 may send a notification to the user and training personnel (e.g., an IT department). The notifications may be email notifications, text messages, push notifications, or other suitable notifications.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, some or all of the blocks of the methods described herein may be performed by suitable components of the system according to the computational capacity of the components, and to reduce the amount of data transmission (e.g., to transmit data buffers or recordings) between the components. For example, identification of a device malfunction may occur at each individual device, and the device may send an indication of the device malfunction to the server to track trends and for record-keeping.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
    obtaining a device event indicator representing an event detected at a device sensor of a subject device;
    obtaining an external event indicator representing an external event detected by an environmental sensor, the external event occurring external to the subject device;
    identifying a device malfunction at the subject device based on the device event indicator and the external event indicator;
    in response to identifying the device malfunction at the subject device, obtaining one or more of: an external event recording and an external event data buffer; and
    analyzing the one or more of the external event recording and the external event data buffer to identify a new external event indicator.

2. The method of claim 1, wherein obtaining the external event indicator comprises:
    obtaining external event data representing external events detected by the environmental sensor; and
    matching external event data patterns from the external event data to predefined external event patterns representing external event indicators.

3. The method of claim 2, further comprising evaluating contextual data of the external event data patterns to obtain the external event indicator.

4. The method of claim 1, wherein the device malfunction is identified when the device event indicator and the external event indicator occur within a threshold time period of one another.

5. The method of claim 1, wherein identifying the device malfunction at the subject device comprises:
    in response to detecting the external event indicator, obtaining one or more of: a device event recording lasting a recording period; and a device event data buffer; and
    in response to detecting the device event indicator in one or more of the device event recording and the device event data buffer, identifying the device malfunction.

6. The method of claim 1, wherein analyzing the one or more of the external event recording and the external event data buffer comprises inputting external event data from the one or more of the external event recording and the external event data buffer to a machine learning engine to identify the new external event indicator.

7. The method of claim 1, wherein analyzing the one or more of the external event recording and the external event data buffer comprises analyzing trends based on the device malfunction and historical device malfunction data to identify the new external event indicator.

8. The method of claim 1, wherein the external event indicator comprises an audio signal.

9. The method of claim 1, further comprising:
    recording the device malfunction;
    identifying a trend based on the device malfunction and historical device malfunction data; and
    sending a notification of the trend to a client device.

10. A server comprising:
    a memory;
    a processor interconnected with the memory, the processor configured to:
        obtain a device event indicator, the device event indicator representing an event detected at a device sensor of a subject device;
        obtain an external event indicator representing an external event detected by an environmental sensor, the external event occurring external to the subject device;
        identify a device malfunction at the subject device based on the device event indicator and the external event indicator;

in response to identifying the device malfunction at the subject device, obtain one or more of: an external event recording and an external event data buffer; and analyze external event data from the one or more of the external event recording and the external event data buffer to identify a new external event indicator.

11. The server of claim 10, wherein the processor is configured to identify the device malfunction when the device event indicator and the external event indicator occur within a threshold time period of one another.

12. The server of claim 10, wherein to obtain the device event indicator, the processor is configured to:

in response to obtaining the external event indicator, obtain one or more of: a device event recording and a device event data buffer; and correlate device event data from the one or more of the device event recording and the device event data buffer to the external event indicator to identify the device event indicator.

13. The server of claim 12, wherein the processor is configured to input the device event data from the one or more of the device event recording and the device event data buffer to an artificial intelligence engine to identify the device event indicator and to identify the device malfunction.

14. The server of claim 10, wherein to obtain the external event indicator, the processor is configured to:

in response obtaining the device event indicator, obtain one or more of: an external event recording and an external event data buffer; and match external event data from the one or more of the external event recording and the external event data buffer to predefined external event patterns to identify the external event indicator.

15. The server of claim 14, wherein the processor is configured to input the external event data from the one or more of the external event recording and the external event data buffer to an artificial intelligence engine to identify the external event indicator and to identify the device malfunction.

16. The server of claim 10, wherein to analyze the external event data from the one or more of the external event recording and the external event data buffer, the processor is configured to input the external event data to an artificial intelligence engine to identify the new external event indicator.

17. The server of claim 10, wherein the processor is further configured to:

record the device malfunction;
identify a trend based on the device malfunction and historical device malfunction data; and
send a notification of the trend to a client device.

18. A device comprising:

a device sensor to detect device events occurring at the device;
a memory storing a device event data buffer;
a communications interface; and
a processor interconnected with the device sensor, the memory and the communications interface, the processor configured to:

obtain, from the device sensor, a device event indicator representing a device event;
obtain an external event indicator representing an external event occurring external to the device;
identify a device malfunction of the device based on the device event indicator and the external event indicator;
in response to identifying the device malfunction at the subject device, obtain one or more of: an external event recording and an external event data buffer; and
analyze external event data from the one or more of the external event recording and the external event data buffer to identify a new external event indicator.

19. The device of claim 18, wherein to obtain the device event indicator, the processor is configured to:

compare the device events detected by the device sensor to a predefined device event sequence; and
when the device events matches the predefined device event sequence, identify the device events as the device event indicator.

20. The device of claim 19, wherein obtain the external event indicator, the processor is configured to:

in response obtaining the device event indicator, obtain one or more of: an external event recording and an external event data buffer; and
match external event data from the one or more of the external event recording and the external event data buffer to predefined external event patterns to identify the external event indicator.

21. The device of claim 18, further comprising an environmental sensor configured to detect the external event occurring external to the device.

22. The device of claim 21, wherein to obtain the external event indicator, the processor is configured to:

compare external event data representing the external event to a predefined external event pattern; and
when at least a portion of the external event data matches the predefined external event pattern, identify the external event data as the external event indicator.

23. The device of claim 22, wherein the processor is further configured to:

evaluate contextual data related to the external event data which matches the predefined external event pattern; and
when conditions of the contextual data are satisfied, confirm the external event data as the external event indicator.

24. The device of claim 22, wherein to obtain the device event indicator, the processor is configured to:

in response to obtaining the external event indicator, obtain one or more of: a device event recording and a device event data buffer; and
correlate device event data from the one or more of the device event recording and the device event data buffer to the external event indicator to identify the device event indicator.

25. The device of claim 18, wherein the processor is further configured to send an indication of the device malfunction to a server to analyze trends.

26. A system for detecting device malfunctions, the system comprising:

a server;
a subject device including a device sensor configured to detect device events; and
an environmental sensor configured to detect external events occurring external to the subject device;
wherein the subject device is configured to:

identify a device event indicator from the subject device, the device event indicator indicative of a potential device malfunction;

obtain an external event indicator from the environmental sensor, the external event indicator indicative of user frustration;

identify a device malfunction at the subject device based on the device event indicator and the external event indicator;

in response to identifying the device malfunction at the subject device, obtain one or more of: an external event recording and an external event data buffer;

analyze external event data from the one or more of the external event recording and the external event data buffer to identify a new external event indicator; and send an indication of the device malfunction to the server to analyze one or more trends.

27. The system of claim 26, wherein the environmental sensor is integrated with the subject device.

28. The system of claim 26, wherein the subject device is configured to:

compare a detected device event to a predefined device event sequence; and when the device event matches the predefined device event sequence, identify the device event as the device event indicator.

29. The system of claim 28, wherein to obtain the external event indicator, the subject device is configured to:

in response identifying the device event indicator, obtain one or more of: an external event recording and an external event data buffer from the environmental sensor; and match external event data from the one or more of the external event recording and the external event data buffer to predefined external event patterns to identify the external event indicator.

30. The system of claim 26, wherein the subject device is configured to:

compare external event data representing the external event to a predefined external event pattern; and when at least a portion of the external event data matches the predefined external event pattern, identify the external event data as the external event indicator.

31. The system of claim 30, wherein the subject device is further configured to:

evaluate contextual data related to the external event data which matches the predefined external event pattern; and when conditions of the contextual data are satisfied, confirm the external event data as the external event indicator.

32. The system of claim 30, wherein to identify the device event indicator, the subject device is configured to:

in response to obtaining the external event indicator, obtain one or more of: a device event recording and a device event data buffer; and correlate device event data from the one or more of the device event recording and the device event data buffer to the external event indicator to identify the device event indicator.

33. The system of claim 26, wherein to identify the device malfunction, the subject device is configured to identify the device malfunction when the device event indicator and the external event indicator occur within a threshold time period of one another.

34. The system of claim 26, wherein the server is further configured to:

record the device malfunction;

identify a trend based on the device malfunction and historical device malfunction data; and send a notification of the trend to a client device.

* * * * *